US008589609B2

(12) United States Patent
Hilburn

(10) Patent No.: US 8,589,609 B2
(45) Date of Patent: Nov. 19, 2013

(54) CABLING BETWEEN RACK DRAWERS USING PROXIMITY CONNECTORS AND WIRING FILTER MASKS

(75) Inventor: John Charles Hilburn, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 308 days.

(21) Appl. No.: 12/908,382

(22) Filed: Oct. 20, 2010

(65) Prior Publication Data

US 2012/0102247 A1 Apr. 26, 2012

(51) Int. Cl.
*G06F 13/00* (2006.01)
*G06F 3/00* (2006.01)

(52) U.S. Cl.
USPC ............ 710/104; 710/2; 710/107; 710/300

(58) Field of Classification Search
USPC .............................. 710/2, 107, 300
See application file for complete search history.

(56) References Cited

U.S. PATENT DOCUMENTS

| 4,686,608 | A | | 8/1987 | Hosking | 361/428 |
|---|---|---|---|---|---|
| 5,613,033 | A | * | 3/1997 | Swamy et al. | 361/790 |
| 5,673,478 | A | * | 10/1997 | Beene et al. | 29/830 |
| 5,701,233 | A | * | 12/1997 | Carson et al. | 361/735 |
| 6,038,130 | A | * | 3/2000 | Boeck et al. | 361/735 |
| 6,147,877 | A | * | 11/2000 | Strandberg et al. | 361/784 |
| 6,347,963 | B1 | | 2/2002 | Falkenberg et al. | 439/638 |
| 6,418,026 | B1 | | 7/2002 | Ho et al. | 361/727 |
| 6,418,027 | B1 | * | 7/2002 | Suzuki et al. | 361/729 |
| 6,479,755 | B1 | * | 11/2002 | Kim et al. | 174/250 |
| 6,483,709 | B1 | | 11/2002 | Layton | 361/724 |
| 6,667,555 | B2 | * | 12/2003 | Cohn et al. | 257/777 |
| 6,741,463 | B1 | | 5/2004 | Akhtar et al. | 361/686 |
| 6,774,458 | B2 | * | 8/2004 | Fricke et al. | 257/530 |
| 6,882,525 | B2 | | 4/2005 | Paul et al. | 361/685 |
| 6,893,951 | B2 | * | 5/2005 | Fricke et al. | 438/600 |
| 6,912,599 | B2 | * | 6/2005 | Sicola et al. | 710/8 |
| 6,920,511 | B2 | * | 7/2005 | Sicola et al. | 710/100 |
| 7,099,340 | B2 | | 8/2006 | Liva et al. | 370/401 |
| 7,111,080 | B2 | * | 9/2006 | Moon | 710/2 |
| 7,289,334 | B2 | | 10/2007 | Behrens et al. | 361/788 |
| 7,291,032 | B1 | | 11/2007 | Carver et al. | 439/310 |
| 7,380,131 | B1 | * | 5/2008 | Trimberger | 713/193 |
| 7,452,236 | B2 | | 11/2008 | Verdiell et al. | 439/540.1 |
| 7,722,375 | B2 | * | 5/2010 | Hagen et al. | 439/310 |
| 8,062,071 | B2 | * | 11/2011 | Yamakami et al. | 439/631 |
| 2002/0063621 | A1 | * | 5/2002 | Tseng et al. | 340/2.7 |
| 2006/0174031 | A1 | * | 8/2006 | Yamakoshi et al. | 709/237 |
| 2007/0023883 | A1 | * | 2/2007 | Brunnbauer et al. | 257/678 |
| 2007/0081308 | A1 | | 4/2007 | Ishida | 361/724 |

FOREIGN PATENT DOCUMENTS

DE 200 23 788 U1 8/2006

* cited by examiner

*Primary Examiner* — Paul R Myers
*Assistant Examiner* — Christopher A Daley
(74) *Attorney, Agent, or Firm* — Van Leeuwen & Van Leeuwen; Matthew W. Baca

(57) ABSTRACT

An approach is provided in which a number of inter-unit communication connections are detected between a rack-mounted system unit and adjacent rack-mounted system units. The connections are established by a set of electrical contacts selected from a set of available electrical contacts included on surfaces of the rack-mounted system unit. The set of electrical contacts is determined by physical masks inserted between the rack-mounted system unit and adjacent rack-mounted system units. A configuration of rack-mounted system units is identified including the rack-mounted system unit and the adjacent system units rack based on an arrangement of the inter-unit communication connections.

20 Claims, 10 Drawing Sheets

CABLING BETWEEN RACK DRAWERS USING PROXIMITY CONNECTORS AND WIRING FILTER MASKS

TECHNICAL FIELD

The present invention relates to providing communication connections between rack-mounted units in a computer system rack. More specifically, the present invention relates to using masks inserted between adjacent rack-mounted units to control communication connections between the units.

BACKGROUND OF THE INVENTION

The current method for expandable rack drawers is to connect cables from rack drawer(s) to rack drawer(s). This can be both in front and rear of the system. As more systems are added, the cabling needs to be reconfigured and can become complex. The cables, in many instances, have to be removed and replaced, in a proper configuration and sequence, in order to service parts located behind the cables. Because of the size requirements of the current cabling solution, the cables are routinely routed outside of the rack drawer space. In addition, due to cabling space requirements of current solutions, some systems may not be installable into different (e.g., OEM) racks that do not allow for the needed space.

SUMMARY

An approach is provided in which a number of inter-unit communication connections are detected between a rack-mounted system unit and adjacent rack-mounted system units. The connections are established by a set of electrical contacts selected from a set of available electrical contacts included on surfaces of the rack-mounted system unit. The set of electrical contacts is determined by physical masks inserted between the rack-mounted system unit and adjacent rack-mounted system units. A configuration of rack-mounted system units is identified including the rack-mounted system unit and the adjacent system units rack based on an arrangement of the inter-unit communication connections.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
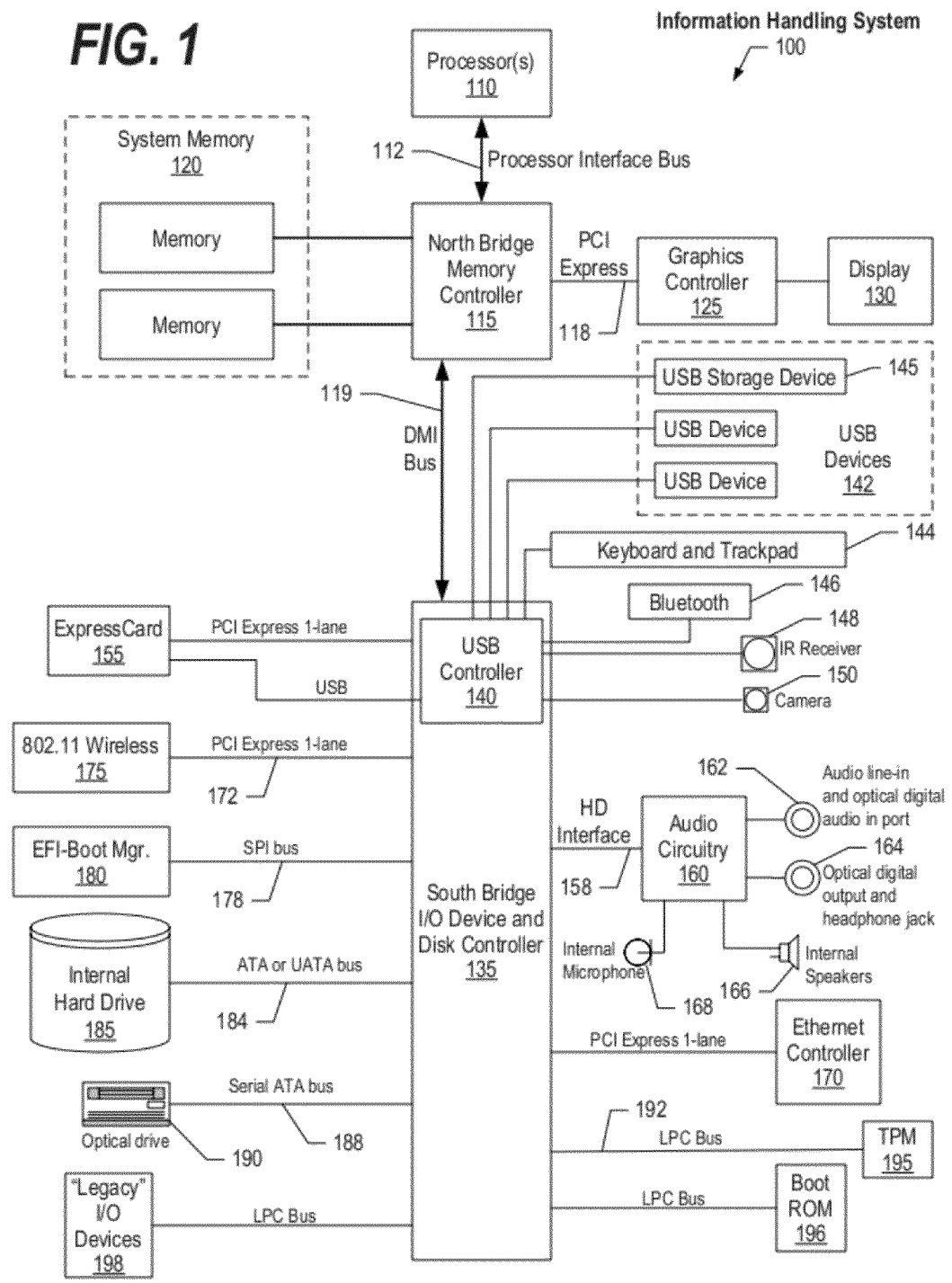
FIG. 1 is a block diagram of a data processing system in which the methods described herein can be implemented.
Figure 2:
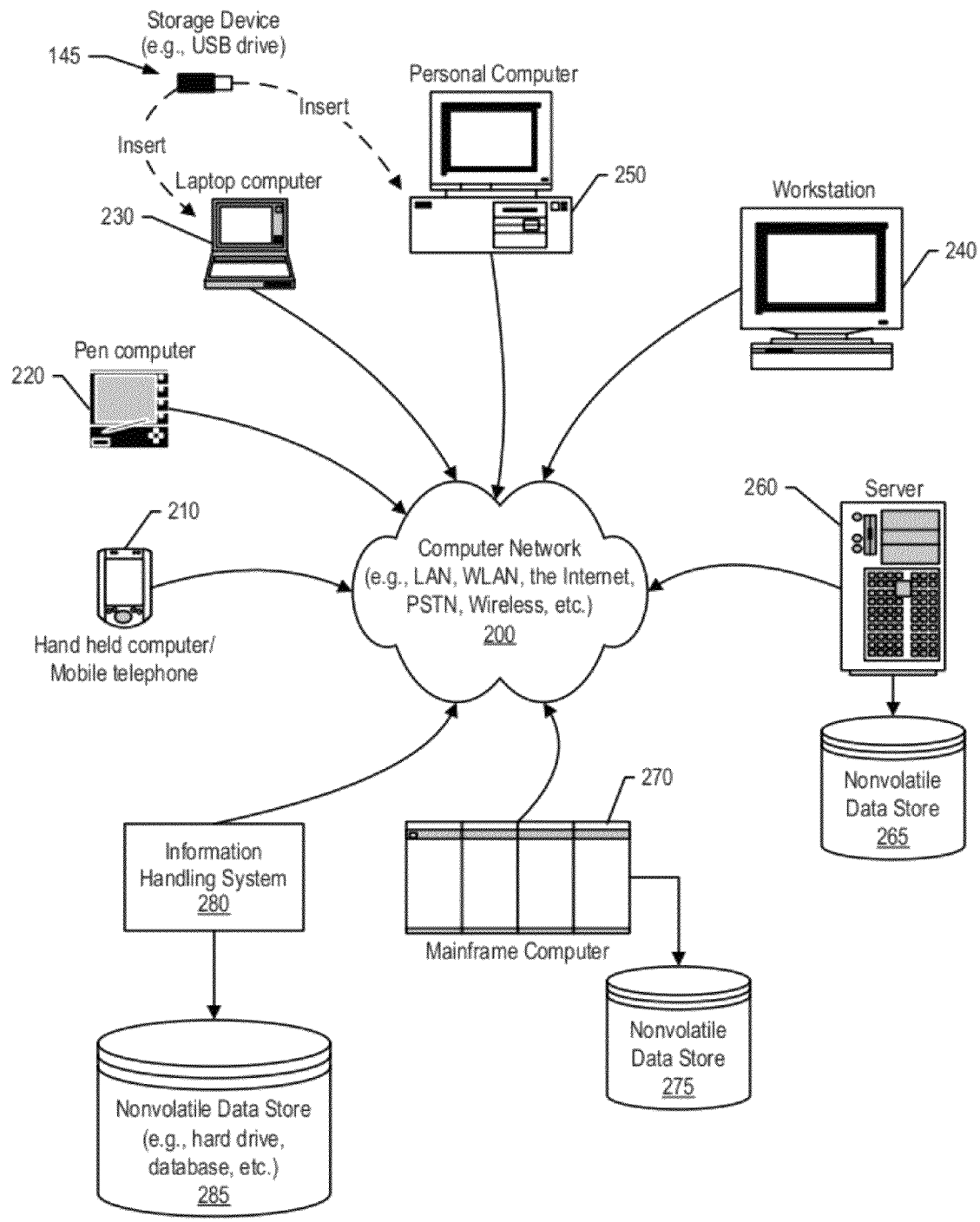
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
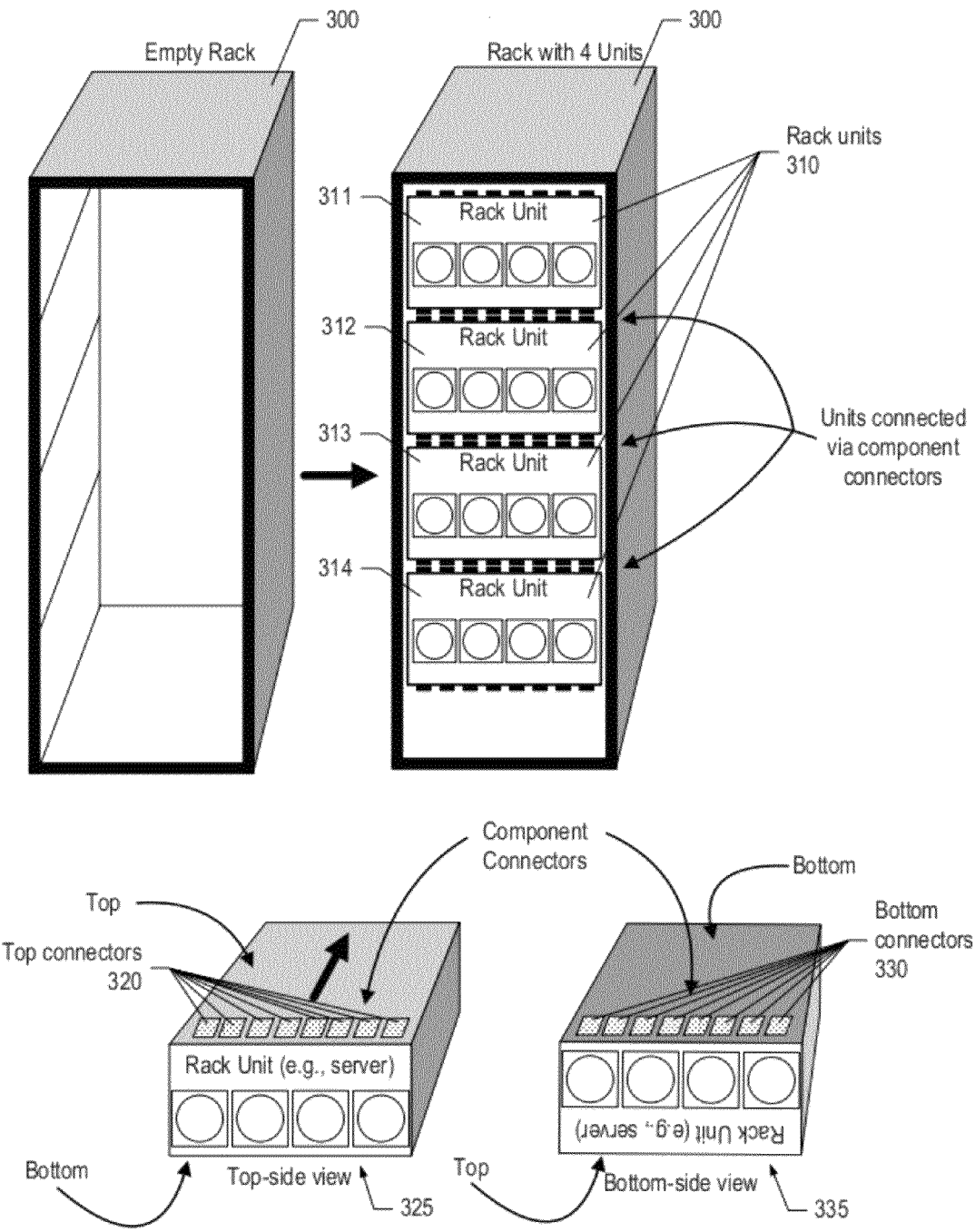
FIG. 3 is a diagram showing a storage rack having units with inter-unit connectors used to provide electrical connections between rack units.

FIG. 3 is a diagram showing a storage rack having units with inter-unit connectors used to provide electrical connections between rack units. System rack 300 is a standardized frame or enclosure for mounting multiple equipment modules or rack drawers, herein referred to as rack-mounted system units 310. System rack 300 shown in FIG. 3 is able to store at least four rack-mounted system units, one on top of another. In other rack configurations, rack-mounted system units may be positioned side-by-side to each other or in a grid pattern (horizontally and vertically positioned adjacent to other rack-mounted system units). In FIG. 3, four rack-mounted system units are shown—topmost rack-mounted system unit 311, rack-mounted system unit 312, rack-mounted system unit 313, and rack-mounted system unit 314. Each of the rack-mounted system units is adjacent to at least one other rack-mounted system unit with two of the rack-mounted system units (312 and 313) being adjacent to two rack-mounted system units.

An individual rack-mounted system unit is shown in top-side view 325 and bottom-side view 335 in order to show electrical contacts located on the top and the bottom of the surface of the rack-mounted system unit. Top electrical contacts 320 are shown on the top of the rack-mounted system unit and bottom electrical contacts are shown on the bottom or rack-mounted system unit. When positioned in system rack 300, the electrical contacts of one rack-mounted system unit make contact with the electrical contacts of another rack-mounted system unit to provide communication between the rack-mounted system units. In the example shown, one or more of the electrical contacts located on the bottom of rack-mounted system unit 311 make contact with a corresponding one or more electrical contacts located on the top of rack-mounted system unit 312. Likewise, one or more of the electrical contacts located on the bottom of rack-mounted system unit 312 make contact with a corresponding one or more electrical contacts located on the top of rack-mounted system unit 313, and one or more of the electrical contacts located on the bottom of rack-mounted system unit 313 make contact with a corresponding one or more electrical contacts located on the top of rack-mounted system unit 314.

A physical mask is inserted between the units so that some of the electrical contacts make contact with corresponding electrical contacts of the adjacent unit, while other contacts are blocked by the mask. Communication signals can be sent from one rack-mounted system unit to another rack-mounted system unit through the unblocked electrical contacts. The unblocked electrical contacts form inter-unit communication connections. As described in further detail below, each rack-mounted system unit can identify the configuration of rack-mounted system units within the system rack based upon the arrangement of the inter-unit communication connections. The configuration includes the number of rack-mounted system units included in the system rack as well as the position of each rack-mounted system unit within the system rack. Input and output ports are identified based upon the configuration so that each rack-mounted system unit can communicate to any of the other rack-mounted system units, even if the other rack-mounted system unit is not adjacent. For example, rack-mounted system unit 311 can send a signal to rack-mounted system unit 314 by first sending a signal to an output port that connects rack-mounted system unit 311 to rack-mounted system unit 312. Rack-mounted system unit 312 recognizes that the signal is addressed to rack-mounted system unit 314 based upon the input port that received the signal. Rack-mounted system unit 312 routes the signal through its output port that is mapped to rack-mounted system unit 314. This signal is sent to rack-mounted system unit 313 which also recognizes, based on the input port, that the signal is addressed to rack-mounted system unit 314 and routes the signal to rack-mounted system unit 314 using its output port that is mapped to rack-mounted system unit 314. Finally, rack-mounted system unit 314 receives the signal at an input port and recognizes that it is the addressee of the signal based on the input port. In one embodiment where a system rack has up to four rack-mounted system units mounted and communicating with each other, each of the rack-mounted system units has approximately eight electrical contacts on both the top and the bottom of the unit so that straight-line communication can be provided between each unit's top and bottom sets of electrical contacts. Note that each of the electrical contacts may include any number of physical electrical conduits (e.g., pins). For example, each electrical contact can include eight pins so that an entire byte of data can be transmitted simultaneously. Other embodiments can use greater or fewer numbers of pins based upon the desired communication speed (bandwidth) and the available space on the surface area of the rack-mounted system unit where the electrical contacts are located.

Figure 4A:
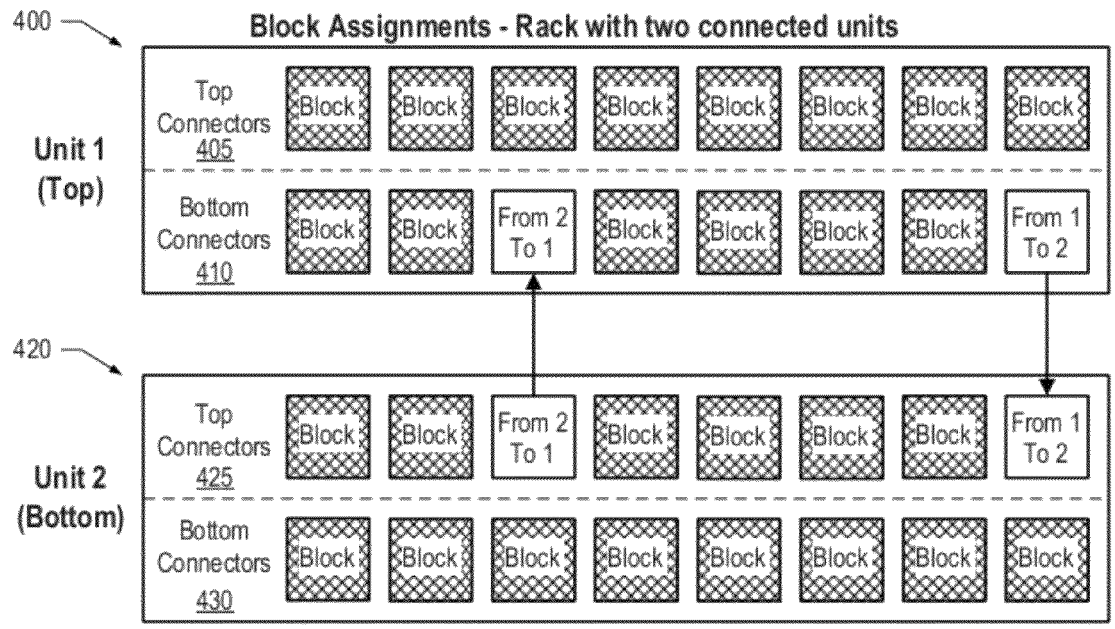
FIG. 4A is a diagram of block assignments for a storage rack with two interconnected units.

FIG. 4A is a diagram of block assignments for a storage rack with two interconnected units. In this example, the system rack in which the rack-mounted system units are located is capable of having four interconnected units, but in this example only two rack-mounted system units are mounted in the system rack. Top unit block assignments 400 show the inter-unit communication connections from the top unit's perspective and bottom unit block assignments 420 show the inter-unit communication connections from the bottom unit's perspective. Here, because there is no unit above the top unit, top electrical contacts 405 of top unit 400 are all blocked (not connected). Likewise, because there is no unit below bottom unit 420, bottom electrical contacts 430 are all blocked (not connected). However, adjacent surfaces (the bottom of top unit 400 and the top of bottom unit 420) have some open (unblocked) connections to allow communication between the units. Because only two rack-mounted system units are included in the system rack, only two electrical contacts in each unit need to be left unblocked—one to transmit signals to the other unit and the other to receive signals from the other unit.

In one embodiment, each blocked electrical contact, when detected, is noted as OFF ('0') and each unblocked electrical contact that forms an inter-unit communication connection is noted as ON ('1') with the top set of available electrical contacts forming one byte of eight bits and the bottom set of available electrical contacts forming another byte of eight bits. Strung together, the two bits form an arrangement of the inter-unit communication connections that identify the configuration. Since top connectors 405 of top unit 400 are each blocked, the bitwise representation of the top connectors would be '00000000'. Bottom connectors 410 of top unit 400 have two unblocked electrical contacts at the third and eighth position so the bitwise representation of the bottom connector would be '00100001'. Strung together, the bitwise representation of a top unit in a two-unit system would therefore be '00000000 00100001'. Bottom unit 420 in a two-unit system would provide the same bitwise representation in reverse with the unblocked electrical contacts at the third and eighth position of top electrical contacts 425 and all of the electrical contacts in bottom connector 430 being blocked which, strung together form a bitwise representation of '00100001 00000000'.

Figure 4B:
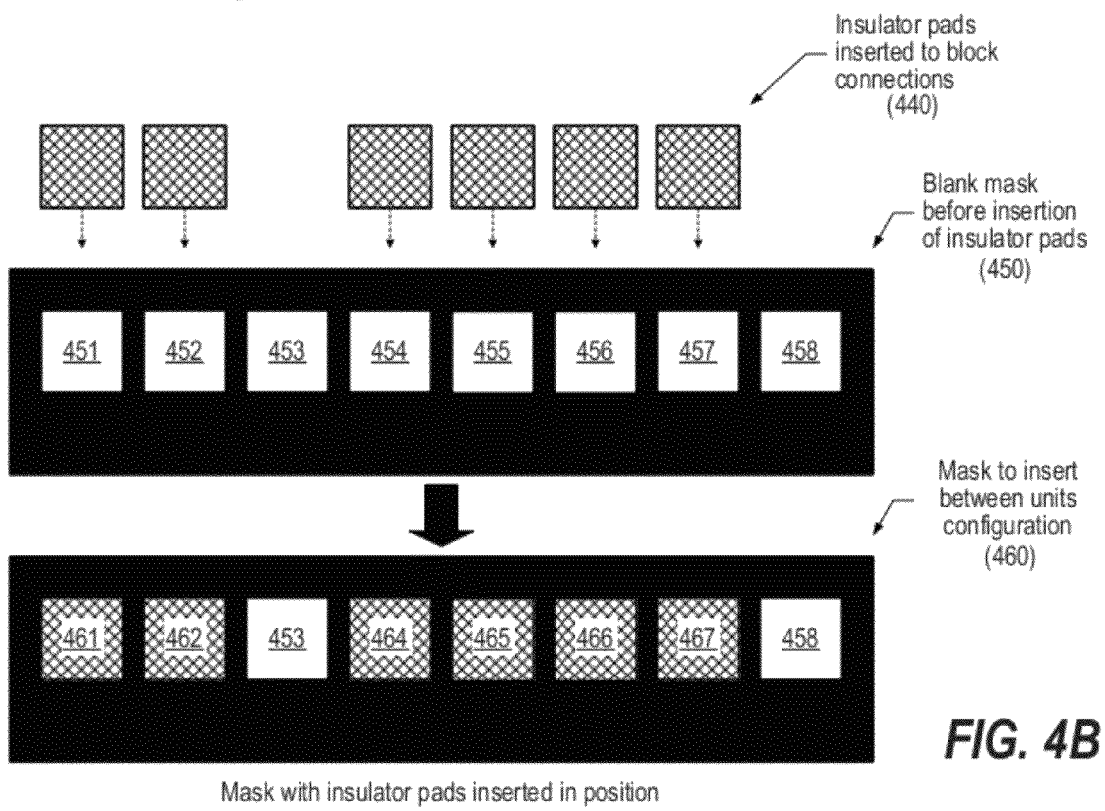
FIG. 4B is a diagram of a connector mask with inserted insulator pads to enable connections between two interconnected units.

FIG. 4B is a diagram of a connector mask with inserted insulator pads to enable connections between two interconnected units. Blank mask 450 includes eight apertures 451 to 458. In order to provide inter-unit communication connections at the third and eighth positions between adjacent units in a two-unit configuration, insulator pads 440 are inserted to block six of the apertures so that mask 460 is formed. In one embodiment, insulator pads snap in place over apertures in order to block inter-unit communication connections. Mask 460 is a physical mask that includes blocks 461 and 462 at the first and second positions, open aperture 453 at the third position, blocks 464 to 467 at the fourth through seventh positions, and open aperture 458 at the eight position. Now, when mask 460 is inserted between the two units in a two-unit configuration, the third and eighth positions are left open allowing inter-unit communication connections at these electrical contacts.

Figure 5A:
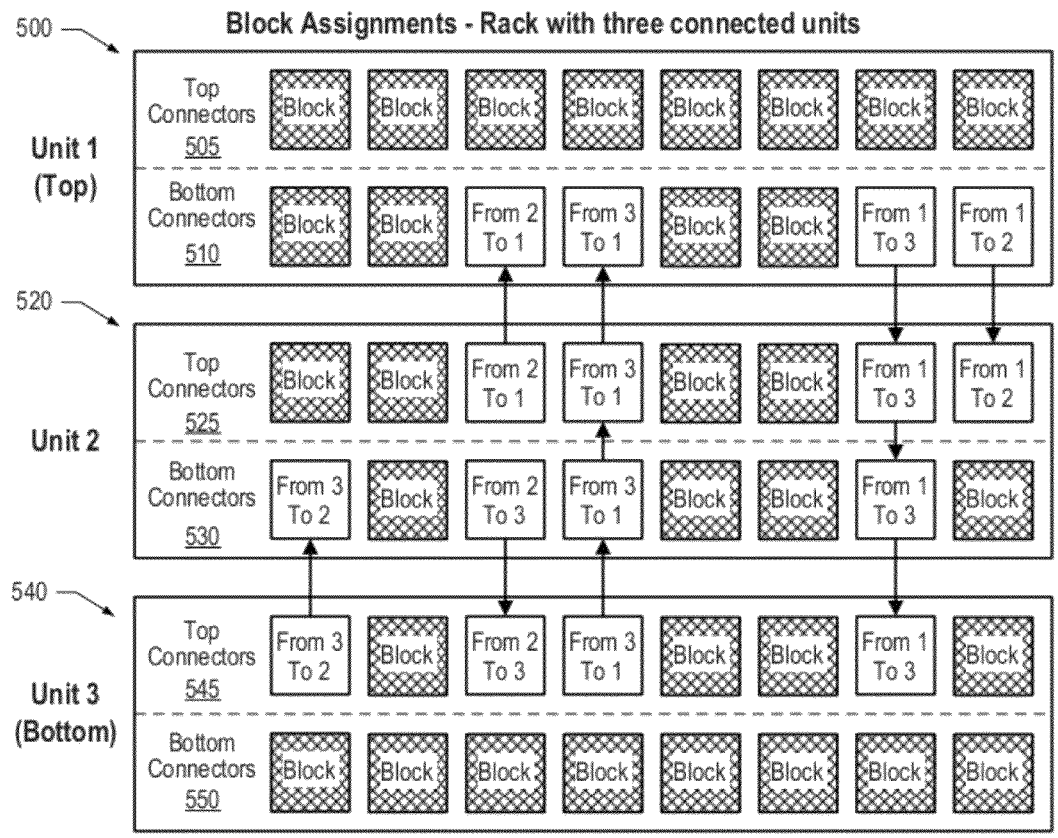
FIG. 5A is a diagram of block assignments for a storage rack with three interconnected units.

FIG. 5A is a diagram of block assignments for a storage rack with three interconnected units. In this example, the system rack in which the rack-mounted system units are located is capable of having four interconnected units, but in this example only three rack-mounted system units are mounted in the system rack. Top unit block assignments 500 show the inter-unit communication connections from the top unit's perspective and middle unit block assignments 520 show the inter-unit communication connections from the middle unit's perspective, while bottom unit block assignments 540 show the inter-unit communication connections from the bottom unit's perspective. Here, because there is no unit above the top unit, top electrical contacts 505 of top unit 500 are all blocked (not connected). Likewise, because there is no unit below bottom unit 540, bottom electrical contacts 550 are all blocked (not connected). However, adjacent surfaces (the bottom of top unit 500 and the top of middle unit 520 and the bottom of middle unit 520 and the top of bottom unit 540) have some open (unblocked) connections to allow communication between the units. Because only three rack-mounted system units are included in the system rack, only four electrical contacts in each unit need to be left unblocked. Each unit has two inter-unit communication connections to transmit (send) signals to the other two units and each unit has two inter-unit communication connections to receive signals from the other two units. Bottom connector 510 of top unit 500 and top connectors 525 of middle unit 520 each have the third, fourth, seventh, and eighth positions left open (unblocked) and the other positions blocked (e.g., with insulator pads). Likewise, bottom connectors 530 of middle unit 520 and top connectors 545 of bottom unit 540 each have the first, third, fourth, and seventh left open (unblocked) and the other positioned blocked. So, as described above with reference to FIG. 4A, the bitwise representations where each bit represents a position with a one ('1') indicating that the position is unblocked and a zero ('0') indicating that the position is blocked would result in the following bitwise representation of '00000000 00110011' for a top unit in a three-unit configuration, a bitwise representation of '00110011 10110010' for a middle unit in a three-unit configuration, and a bitwise representation of '10110010 00000000' for a bottom unit in a three-unit configuration. The port assignments of each position are as noted in FIG. 5A. For example, if top unit 500 needs to send a signal to bottom unit 540, the port at the seventh position is used (labeled "From 1 to 3"). The middle unit receives the signal at the top connector seventh position and simply routes it out through the bottom connector seventh position where it is received at the top connector seventh position of the bottom unit. Because each unit detected the inter-unit communication connections established between the units and identified the configuration based, e.g., on the bitwise representations described above, the role of each port (incoming and outgoing) at each of the rack-mounted system unit is understood without need of additional handshaking or communication between the units. Also, as designed herein, if a signal is received at a port and the port does not terminate at the receiving unit, then the receiving unit simply propagates the signal to the corresponding top or bottom port without actually needing to know the destination unit. For example, when middle unit 520 receives a signal at the fourth position, it recognizes that the signal is not intended for the middle unit and simply propagates the signal out through the fourth position in the top connectors without having to determine any particular mapping.

Figure 5B:
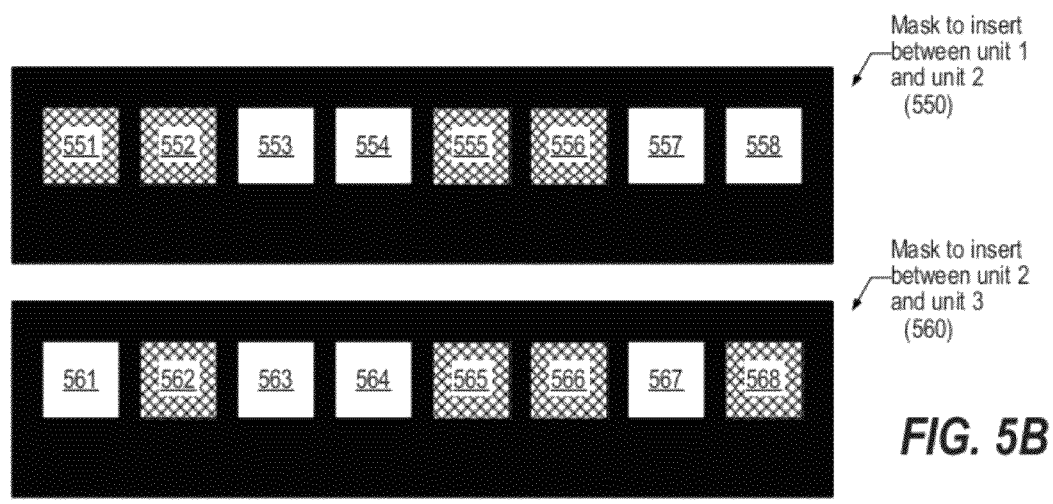
FIG. 5B is a diagram of a connector mask with inserted insulator pads to enable connections between three interconnected units.

FIG. 5B is a diagram of a connector mask with inserted insulator pads to enable connections between three interconnected units. FIG. 5B is similar to FIG. 4B, however in FIG. 5B two masks (550 and 560) are shown for a three-unit configuration introduced in FIG. 5A. In FIG. 5B, mask 550 is inserted between the top and middle units (500 and 520 in FIG. 5A) and mask 560 being the mask to insert between the middle and top units (520 and 540 in FIG. 5A). In mask 550, first and second positions (551 and 552) are shown blocked (e.g., with insulator pads), third and fourth positions (553 and 554) are shown open (unblocked) allowing inter-unit communication connections at these positions, fifth and sixth positions (555 and 556) are shown blocked, and seventh and eighth positions (557 and 558) are shown open (unblocked), again allowing inter-unit communication connections at these positions. Likewise, in mask 560, first position 561 is shown open (unblocked) allowing inter-unit communication connections at this position, second position 562 is shown blocked, third and fourth positions (563 and 564) are shown open (unblocked) allowing inter-unit communication connections at these positions, fifth and sixth positions (565 and 566) are shown blocked, seventh position (567) is shown open allowing inter-unit communication connections at this position, and eighth position (568) is shown blocked.

Figure 6:
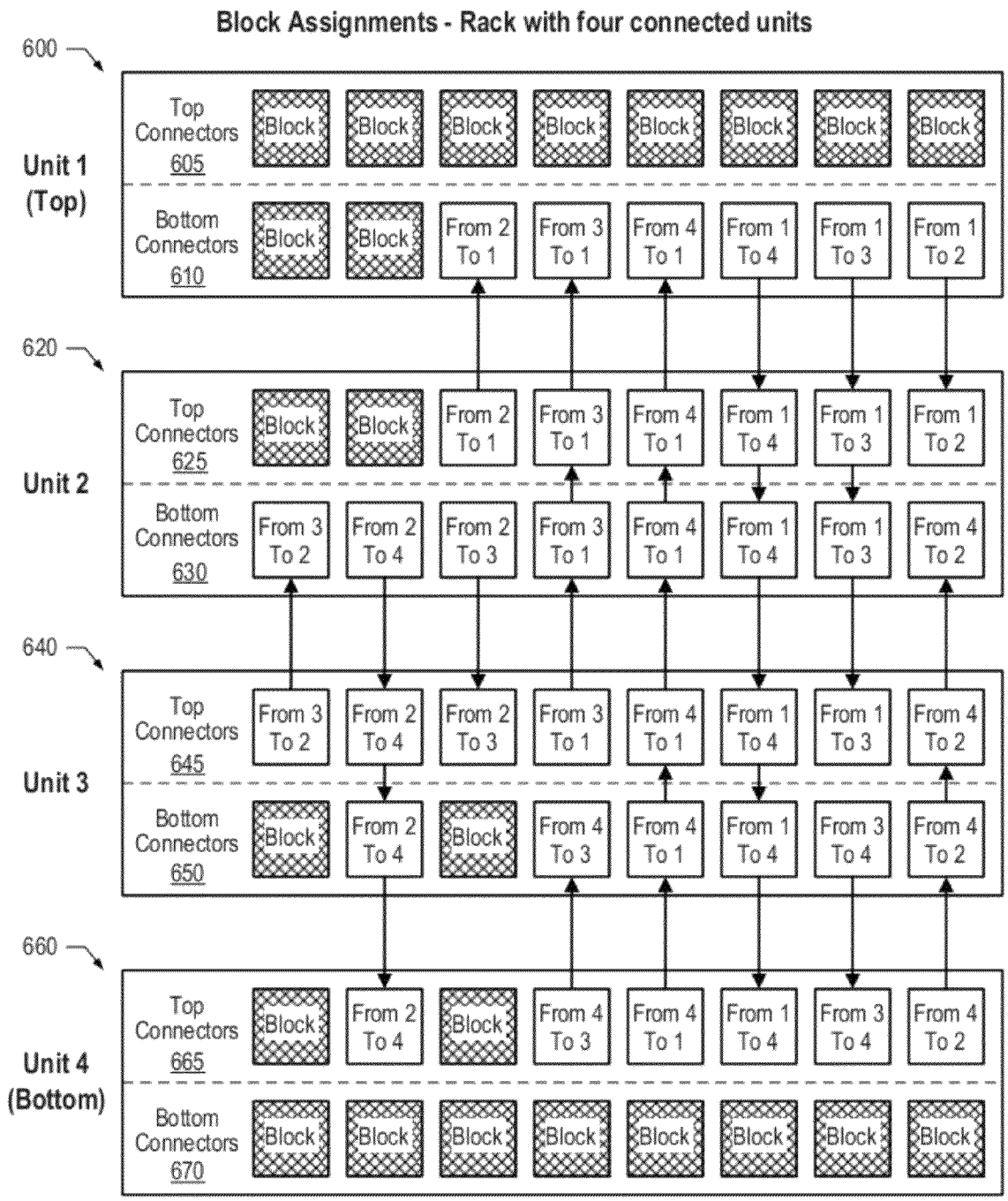
FIG. 6 is a diagram of block assignments for a storage rack with four interconnected units.

FIG. 6 is a diagram of block assignments for a storage rack with four interconnected units—top unit 600, top-middle unit 620, bottom-middle unit 640, and bottom unit 660. Each of these units has a set of top connectors and a set of bottom connectors (top unit 600 having top connectors 605 and bottom connectors 610, top-middle unit 620 having top connectors 625 and bottom connectors 630, bottom-middle unit 640 having top connectors 645 and bottom connectors 650, and bottom unit 660 having top connectors 665 and bottom connectors 670). As previously described, each of the units has a unique arrangement of inter-unit communication connections that identify the configuration of the rack-mounted system unit within the system rack as well as the number of rack-mounted system units within the system rack. Each unit has at least three inter-unit communication connections to transmit (send) signals to the other three units and each unit has at least three inter-unit communication connections to receive signals from the other three units. In addition, the middle two units include two additional "pass-through" inter-unit communication connections to pass communications through to non-adjacent rack-mounted system units. Using the bitwise representations previously introduced, the bitwise representation for top unit 600 is '00000000 00111111', the bitwise representation for top-middle unit 620 is '00111111 11111111', the bitwise representation for bottom-middle unit 640 is '11111111 01011111', and the bitwise representation for bottom unit 660 is '01011111 00000000'.

Using the configurations shown in FIGS. 4A, 5A, and 6, the unique bitwise representations and their corresponding configurations are shown in the following table:

| Bitwise Representation | Number of Units | Unit's Position |
|---|---|---|
| 00000000 00100001 | 2 | Top |
| 00100001 00000000 | 2 | Bottom |

-continued

| Bitwise Representation | Number of Units | Unit's Position |
|---|---|---|
| 00000000 00110011 | 3 | Top |
| 00110011 10110010 | 3 | Middle |
| 10110010 00000000 | 3 | Bottom |
| 00000000 00111111 | 4 | Top |
| 00111111 11111111 | 4 | Top-middle |
| 11111111 01011111 | 4 | Bottom-middle |
| 01011111 00000000 | 4 | Bottom |

When a rack-mounted system unit initializes, it detects the inter-unit communication connections between the unit and one or more adjacent rack-mounted system units and assigns a '1' to any unblocked inter-unit communication connections allowed by the masks inserted between the rack-mounted system unit and the adjacent rack-mounted system units and assigns a '0' to any blocked electrical contacts where a inter-unit communication connections is not allowed due to the mask blocking that position (e.g., with an insulator pad). The connectors on the top of the unit form the first eight bits and the connectors on the bottom of the unit form the second eight bits in the bitwise representation. Comparing the unit's bitwise representation to the table shown above provide the unit with the number of units in the system rack as well as this units position in the system rack. Details on what ports (the inter-unit communication connections) are used to send and receive signals to and from other rack-mounted system units is provided in FIGS. 4A, 5A, and 6, depending on whether the system rack includes two, three, or four interconnected rack-mounted system units.

Figure 7:
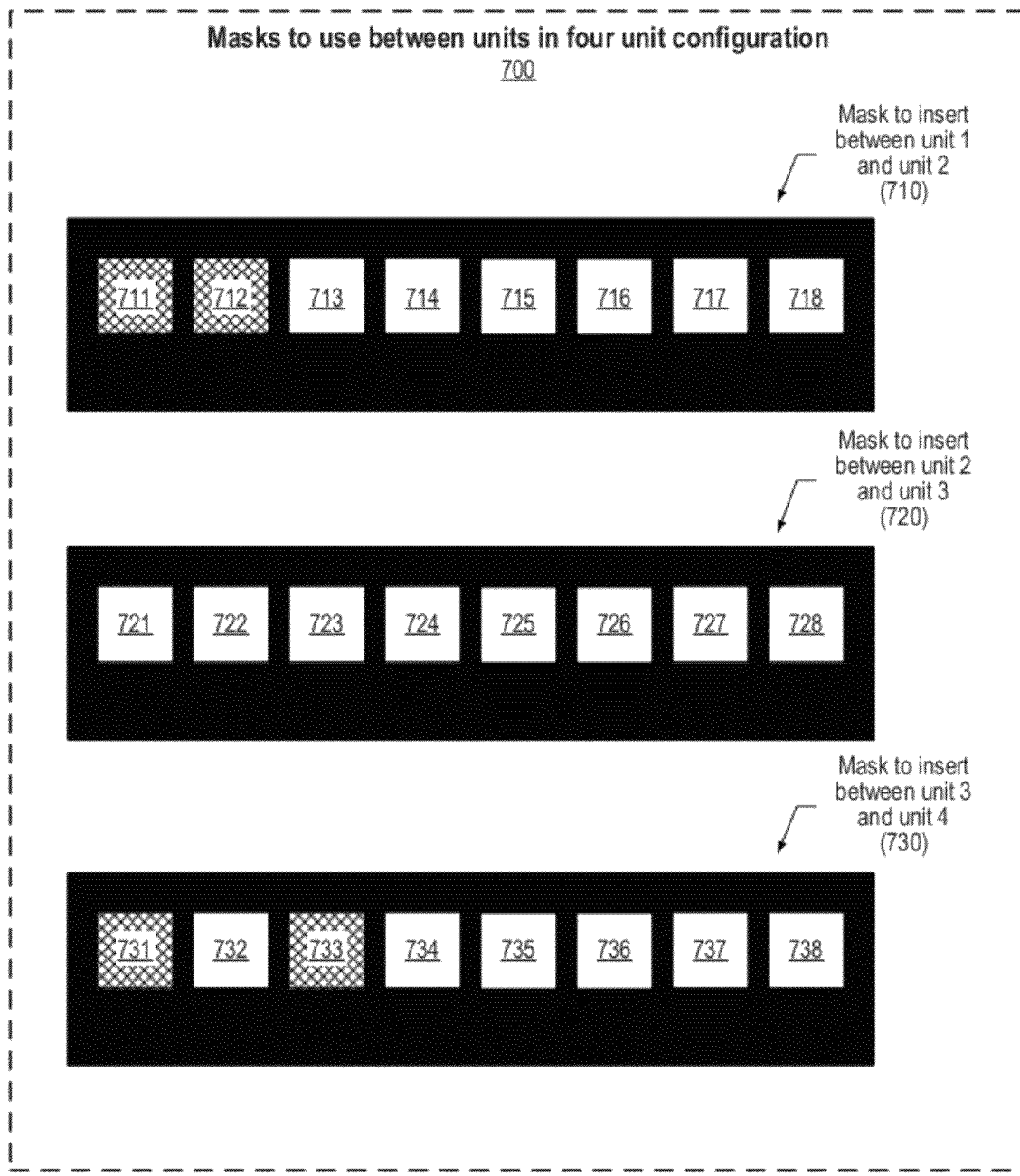
FIG. 7 is a diagram of a connector mask with inserted insulator pads to enable connections between four interconnected units.

FIG. 7 is a diagram of a connector mask with inserted insulator pads to enable connections between four interconnected units shown in FIG. 6. Mask 710 is created and inserted between top unit 600 and top-middle unit 620, mask 720 is created and inserted between top-middle unit 620 and bottom-middle unit 640, and mask 730 is created and inserted between bottom-middle unit 640 and bottom unit 660. Mask 710 has first and second positions (711 and 712) blocked and the remaining positions (713 to 718) open (unblocked) allowing inter-unit communication connections at these positions. Mask 720 has all positions (721 to 728) open (unblocked) allowing inter-unit communication connections at all positions between the units. Finally, mask 730 has blocks at the first and third positions (731 and 733) with the remaining positions (732 and 734 to 738) open (unblocked) allowing inter-unit communication connections at these positions.

Figure 8:
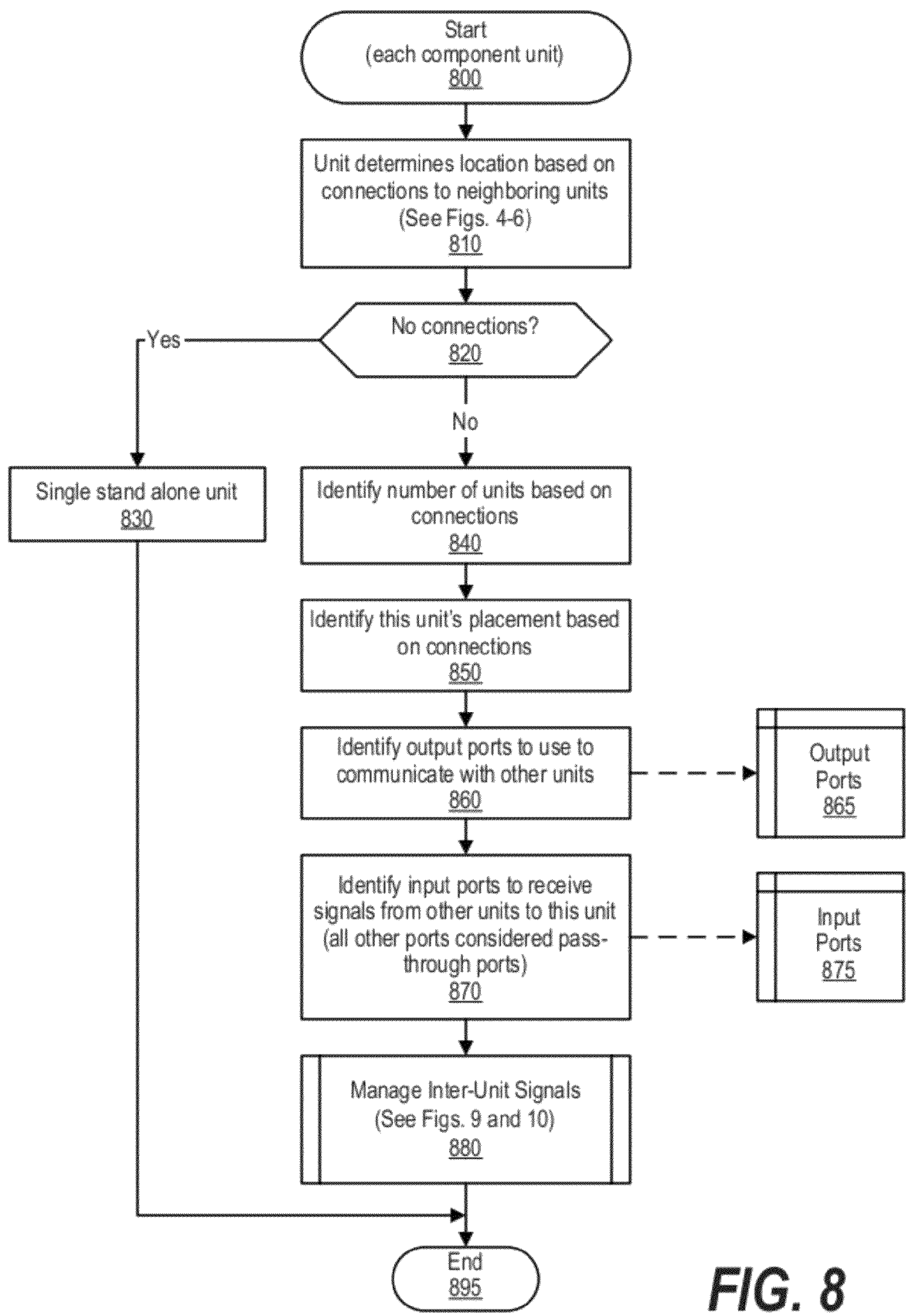
FIG. 8 is a flowchart showing steps taken by units to ascertain numbers of units in a rack and unit placement based on inserted mask.

FIG. 8 is a flowchart showing steps taken by units to ascertain numbers of units in a rack and unit placement based on inserted mask. Processing commences at 800 whereupon, at step 810, the rack-mounted system unit determines its location based on its inter-unit communication connections with adjacent (neighboring) rack-mounted system units. Previous figures and descriptions describe an approach using bitwise representations of the inter-unit communication connections (unblocked electrical contacts) and blocked electrical contacts to uniquely identify the rack-mounted system unit's location within a system rack (see, e.g., the table provided above in reference to FIG. 6). A decision is made as to whether there are no inter-unit communication connections between this rack-mounted system unit and other rack-mounted system units (decision 820). If there are no connections, then decision 820 branches to the "yes" branch whereupon, at step 830, this rack-mounted system unit acts as a stand-alone rack-mounted system unit with no inter-unit communication connections.

On the other hand, if there are one or more connections, then decision 820 branches to the "no" branch whereupon, at step 840, the rack-mounted system unit identifies the total number of rack-mounted system units that are connected to each other in the system rack (see, e.g., the table provided above in reference to FIG. 6). At step 850, the rack-mounted system unit identifies its placement (e.g., top unit, middle unit, etc.) based upon the inter-unit communication connections. In steps 840 and 850, a configuration of rack-mounted system units is identified based on the arrangement of the inter-unit communication connections between this rack-mounted system unit and one or more adjacent rack-mounted system units, as describe with reference to FIGS. 4A, 5A, and 6, above, and the table provided above in reference to FIG. 6. At step 860, the output ports used to communicate from this rack-mounted system unit to other (adjacent or non-adjacent) rack-mounted system units are identified and stored in output ports memory area 865 for future reference. At step 870, the input ports from which this rack-mounted system unit will receive signals from other (adjacent or non-adjacent) rack-mounted system units are identified and stored in input ports memory area 875 for future reference. Note that, as shown in FIGS. 4A, 5A, and 6, some input ports might be used as pass-through ports with the incoming signals propagated out to corresponding output ports in order to travel to their intended rack-mounted system unit. See FIGS. 4A, 5A, and 6 for embodiments of two, three, and four unit configurations with descriptions of the usage of each port, both inputs from other units and outputs to other units. At predefined process 880, the unit manages inter-unit communication signals (see FIG. 9 and corresponding text for processing details regarding the receiving of signals and FIG. 10 and corresponding text for processing details regarding the sending of signals). Processing thereafter ends at 895.

Figure 9:
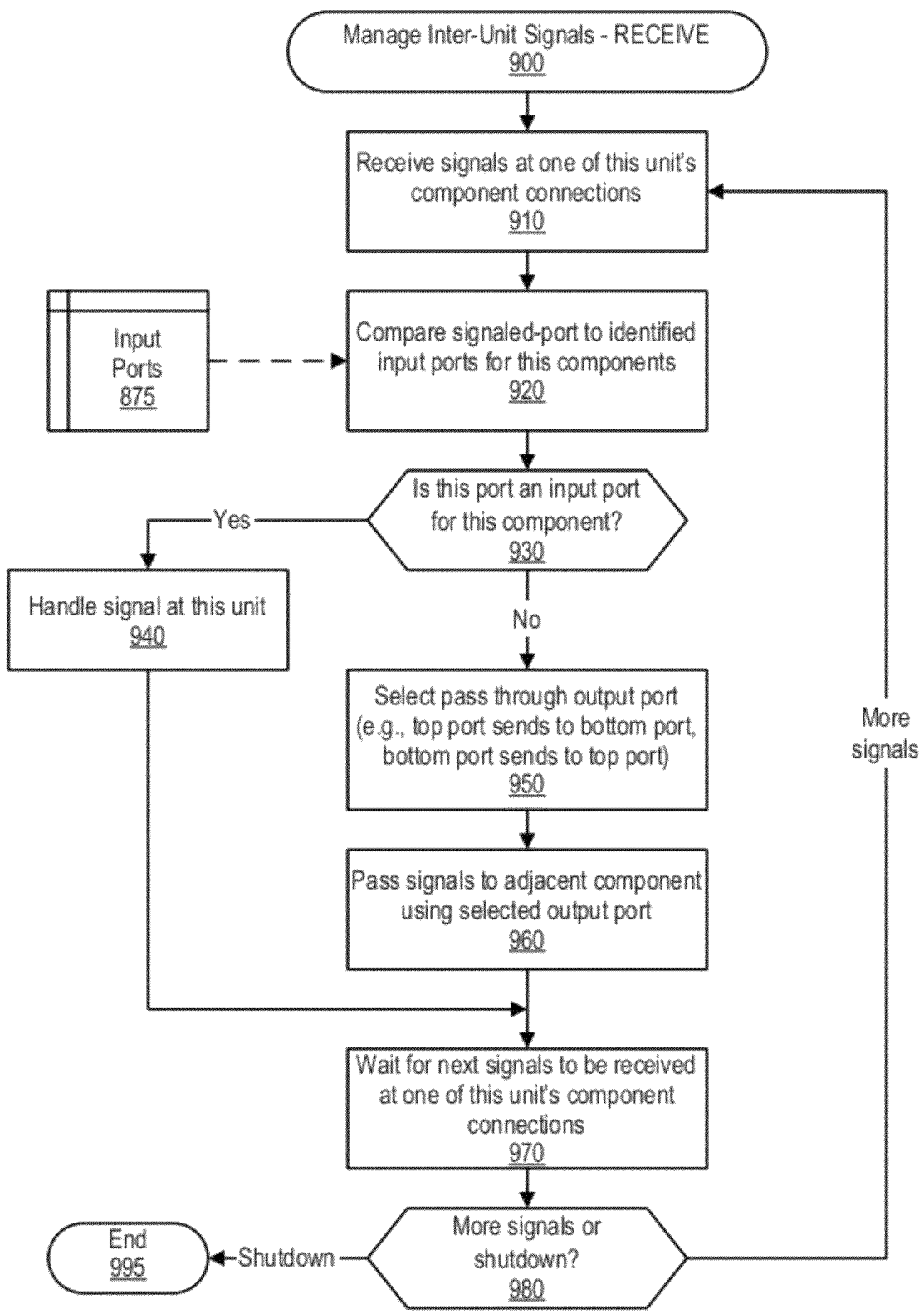
FIG. 9 is a flowchart showing steps taken to receive signals from a neighboring unit and handle signal based upon port identification.

FIG. 9 is a flowchart showing steps taken to receive signals from a neighboring unit and handle signal based upon port identification. Processing commences at 900 whereupon, at step 910, signals are received at one of this rack-mounted system unit's inter-unit communication connections. At step 920, the particular port at which the signal was received is compared to input port descriptions previously identified and stored in input ports memory area 875. A decision is made, based on the comparison, as to whether the port at which the signal was received is a input port for this rack-mounted system unit or is used as a pass through port (decision 930). If the port is an input port for this rack-mounted system unit, then decision 930 branches to the "yes" branch whereupon, at step 940, this rack-mounted system unit handles the inter-unit communication from one of the other rack-mounted system unit included in the system rack.

On the other hand, if the port at which the signal was received is not an input port for this rack-mounted system unit and is instead a pass through port, then decision 930 branches to the "no" branch. In one embodiment, shown in FIGS. 5A and 6, pass through ports using corresponding input and output ports so that the same position is used for both the input and the output (e.g., a signal received at the X position on the bottom connector of the unit is passed through (transmitted) back out at the X position on the top connector, and a signal received at the Y position on the top connector of the unit is passed through (transmitted) back out at the Y position on the bottom connector. At step 960, the signals are passed to the adjacent rack-mounted system unit using the selected output port as described above.

After the received signal has been processed (handled by this rack-mounted system unit or passed through to an adjacent rack-mounted system unit), then, at step 970, the receive process of the unit's inter-unit communication process waits for the next signals to be received at one of the unit's input inter-unit communication connections. A decision is made as to whether more signals are received or the unit is shutting down (decision 980). If more signals are received, then decision 980 branches to the "more signals" branch which loops back to receive and process the next signals as described above. This looping continues until a shutdown is initiated, at which point decision 980 branches to the "shutdown" branch whereupon processing ends at 995.

Figure 10:
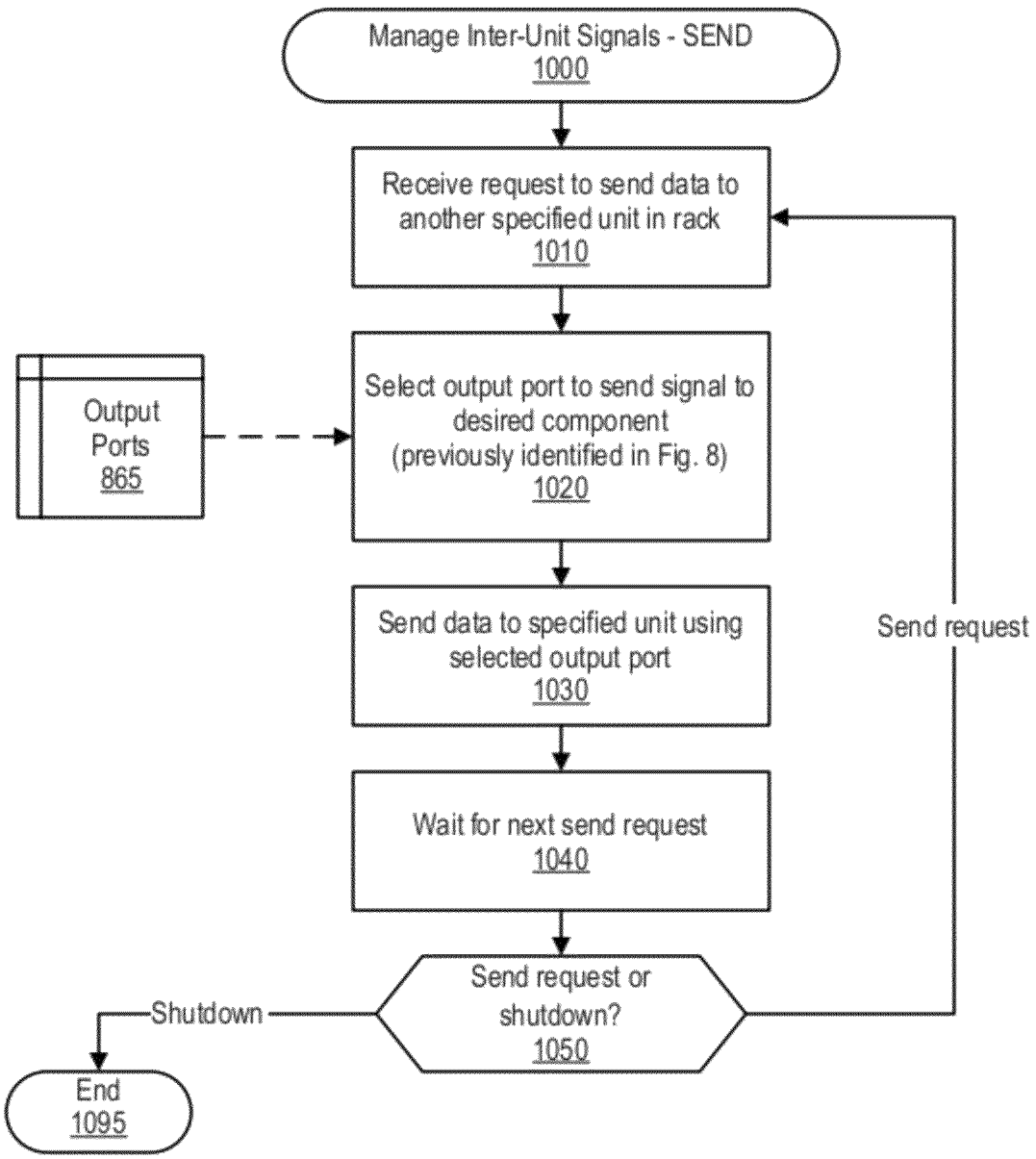
FIG. 10 is a flowchart showing steps taken to send signals from one unit to another unit in the rack.

FIG. 10 is a flowchart showing steps taken to send signals from one unit to another unit in the rack. Processing commences at 1000 whereupon, at step 1010, a request is received (e.g., from a process running on this rack-mounted system unit) to send an inter-unit communication signal to another unit (adjacent or non-adjacent) included in the system rack. At step 1020, the output port is selected from output ports memory area 865 (see FIG. 8 and corresponding text for details regarding the identification of the unit's output ports). At step 1030, the data (a signal) is sent to the desired rack-mounted system unit using the selected output port. At step 1040, the send process of the unit's inter-unit communication process waits for the next request to send inter-unit signals using one of the unit's output inter-unit communication connections. A decision is made as to whether another send request was received or the unit is shutting down (decision 1050). If another send request is received, then decision 1050 branches to the "send request" branch which loops back to receive and process the next request to send data to another rack-mounted system unit as described above. This looping continues until a shutdown is initiated, at which point decision 1050 branches to the "shutdown" branch whereupon processing ends at 1095.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
    detecting a plurality of inter-unit communication connections established between a first rack-mounted system unit and one or more adjacent rack-mounted system units, wherein the connections are established by a set of electrical contacts selected from a larger plurality of available electrical contacts that are included on one or more physical surfaces of the first rack-mounted system unit, and wherein the set of electrical contacts is determined by one or more physical masks inserted between the first rack-mounted system unit and one or more of the adjacent rack-mounted system units;
    generating, at the first rack-mounted system unit, a bitwise representation of a configuration of rack-mounted system units included in a system rack that includes the first rack-mounted system unit and the one or more adjacent system units rack based on an arrangement of the plurality of inter-unit communication connections;
    selecting one or more ports on the first rack mounted system unit based upon the bitwise representation; and
    processing one or more signals at the first rack-mounted system unit utilizing the selected one or more ports.

2. The method of claim 1 wherein each of the physical masks includes one or more apertures that allow the plurality of inter-unit communication connections.

3. The method of claim 1 further comprising:
    receiving one of the signals at a selected one of the inter-unit communication connections from one of the adjacent rack-mounted system units.

4. The method of claim 3 further comprising:
    identifying, based on the bitwise representation, that the received signal is directed to a second rack-mounted system unit included in the system rack;
    selecting an output port included in the selected one or more ports that corresponds to the second rack-mounted system unit based on the bitwise representation; and
    transmitting the signal to the second rack-mounted system unit via the selected output port.

5. The method of claim 3 further comprising:
    identifying, based on the bitwise representation, that the received signal is directed to the first rack-mounted system unit; and
    handling the received signal by the first rack-mounted system unit.

6. The method of claim 1 further comprising:
    receiving a request to send one of the signals to a second rack-mounted system units included in the system rack; and
    transmitting the signal to the second rack-mounted system unit via an output port included in the selected one or more ports.

7. The method of claim 6 wherein the second rack-mounted system unit is not one of the one or more adjacent system units.

8. An information handling system comprising:
a first rack-mounted system unit housed in a system rack, the first rack-mounted system unit comprising:
a plurality of physical surfaces, wherein one or more of the physical surfaces includes a plurality of available electrical contacts
one or more physical masks inserted between the first rack-mounted system unit and one or more of adjacent rack-mounted system units also housed in the system rack;
one or more processors;
a memory coupled to at least one of the processors;
a set of instructions stored in the memory and executed by at least one of the processors in order to perform actions of:
detecting a plurality of inter-unit communication connections established between the first rack-mounted system unit and one or more of the adjacent rack-mounted system units, wherein the connections are established by a set of electrical contacts selected from the plurality of available electrical contacts allowed by the one or more physical masks;
generating, at the first rack-mounted system unit, a bitwise representation of a configuration of rack-mounted system units included in a system rack that includes the first rack-mounted system unit and the one or more adjacent system units rack based on an arrangement of the plurality of inter-unit communication connections;
selecting one or more ports on the first rack mounted system unit based upon the bitwise representation; and
processing one or more signals at the first rack-mounted system unit utilizing the selected one or more ports.

9. The information handling system of claim 8 wherein each of the physical masks includes one or more apertures that allow the plurality of inter-unit communication connections.

10. The information handling system of claim 8 wherein the set of instructions performs additional actions comprising:
receiving one of the signals at a selected one of the inter-unit communication connections from one of the adjacent rack-mounted system units.

11. The information handling system of claim 10 wherein the set of instructions performs additional actions comprising:
identifying, based on the bitwise representation, that the received signal is directed to a second rack-mounted system unit included in the system rack;
selecting an output port included in the selected one or more ports that corresponds to the second rack-mounted system unit based on the bitwise representation; and
transmitting the signal to the second rack-mounted system unit via the selected output port.

12. The information handling system of claim 10 wherein the set of instructions performs additional actions comprising:
identifying, based on the bitwise representation, that the received signal is directed to the first rack-mounted system unit; and
handling the received signal by the first rack-mounted system unit.

13. The information handling system of claim wherein the set of instructions performs additional actions comprising:
receiving a request to send one of the signals to a second rack-mounted system units included in the system rack; and
transmitting the signal to the second rack-mounted system unit via an output port included in the selected one or more ports.

14. The information handling system of claim 13 wherein the second rack-mounted system unit is not one of the one or more adjacent system units.

15. A computer program product stored in a computer readable medium, comprising functional descriptive material that, when executed by an information handling system, causes the information handling system to perform actions that include:
detecting a plurality of inter-unit communication connections established between a first rack-mounted system unit and one or more adjacent rack-mounted system units, wherein the connections are established by a set of electrical contacts selected from a larger plurality of available electrical contacts that are included on one or more physical surfaces of the first rack-mounted system unit, and wherein the set of electrical contacts is determined by one or more physical masks inserted between the first rack-mounted system unit and one or more of the adjacent rack-mounted system units;
generating, at the first rack-mounted system unit, a bitwise representation of a configuration of rack-mounted system units included in a system rack that includes the first rack-mounted system unit and the one or more adjacent system units rack based on an arrangement of the plurality of inter-unit communication connections;
selecting one or more ports on the first rack mounted system unit based upon the bitwise representation; and
processing one or more signals at the first rack-mounted system unit utilizing the selected one or more ports.

16. The computer program product of claim 15 wherein each of the physical masks includes one or more apertures that allow the plurality of inter-unit communication connections.

17. The computer program product of claim 15 wherein the actions further comprise:
receiving one of the signals at a selected one of the inter-unit communication connections from one of the adjacent rack-mounted system units.

18. The computer program product of claim 17 wherein the actions further comprise:
identifying, based on the bitwise representation, that the received signal is directed to a second rack-mounted system unit included in the system rack;
selecting an output port included in the selected one or more ports that corresponds to the second rack-mounted system unit based on the bitwise representation; and
transmitting the signal to the second rack-mounted system unit via the selected output port.

19. The computer program product of claim 17 wherein the actions further comprise:
identifying, based on the bitwise representation, that the received signal is directed to the first rack-mounted system unit; and
handling the received signal by the first rack-mounted system unit.

20. The computer program product of claim 15 wherein the actions further comprise:
receiving a request to send one of the signals to a second rack-mounted system units included in the system rack; and transmitting the signal to the second rack-mounted system unit via an output port included in the selected one or more ports.

* * * * *